US012413882B2

(12) United States Patent
Wang

(10) Patent No.: US 12,413,882 B2
(45) Date of Patent: Sep. 9, 2025

(54) PERSONAL AUDIO SYSTEM AND APPLICATION THEREOF

(71) Applicant: SHENZHEN LONGWEI TECHNOLOGY CO., LTD, Shenzhen (CN)

(72) Inventor: Xinhong Wang, Sichuan (CN)

(73) Assignee: SHENZHEN LONGWEI TECHNOLOGY CO., LTD, Shenzhen (CN)

(*) Notice: Subject to any disclaimer, the term of this patent is extended or adjusted under 35 U.S.C. 154(b) by 226 days.

(21) Appl. No.: 18/258,699

(22) PCT Filed: Dec. 11, 2021

(86) PCT No.: PCT/CN2021/137274
§ 371 (c)(1),
(2) Date: Jun. 21, 2023

(87) PCT Pub. No.: WO2022/135191
PCT Pub. Date: Jun. 30, 2022

(65) Prior Publication Data

US 2024/0048882 A1 Feb. 8, 2024

(30) Foreign Application Priority Data

Dec. 26, 2020 (CN) ......................... 202011569907.1

(51) Int. Cl.
*H04R 1/02* (2006.01)

(52) U.S. Cl.
CPC ....... *H04R 1/025* (2013.01); *H04R 2201/029* (2013.01); *H04R 2499/13* (2013.01)

(58) Field of Classification Search
CPC .............. H04R 1/025; H04R 2201/029; H04R 2499/13
(Continued)

(56) References Cited

U.S. PATENT DOCUMENTS 4,038,499 A 7/1977 Yeaple
10,555,071 B2 * 2/2020 Wakeland .............. G02C 11/10
(Continued)

FOREIGN PATENT DOCUMENTS

CN 201345722 Y 11/2009
CN 108407685 A 8/2018
(Continued)

OTHER PUBLICATIONS

International Written Opinion of corresponding PCT application, PCT/CN2021/137274, dated Mar. 8, 2022, 4 pages.
(Continued)

*Primary Examiner* — Sean H Nguyen
(74) *Attorney, Agent, or Firm* — Tucker Ellis LLP

(57) ABSTRACT

A personal audio system and an application thereof are disclosed. The personal audio system includes a housing, in which a right front loudspeaker, a left front loudspeaker and a controller are arranged. A right rear conduction tube is arranged on the right front loudspeaker. An opening at one end of the right rear conduction tube is tightly connected and sealed to one side of the right front loudspeaker, and an opening at the other end of the right rear conduction tube is away from a right ear. The right front loudspeaker and the left front loudspeaker are arranged symmetrically.

6 Claims, 3 Drawing Sheets

(58) Field of Classification Search
USPC .......................................................... 381/386
See application file for complete search history.

(56) References Cited

U.S. PATENT DOCUMENTS

| | | | |
|---|---|---|---|
| 2019/0118688 | A1 | 4/2019 | Fujikake |
| 2020/0374631 | A1 | 11/2020 | Hayashi |

FOREIGN PATENT DOCUMENTS

| | | | |
|---|---|---|---|
| CN | 112770221 | A | 5/2021 |
| JP | H07264689 | A | 10/1995 |
| JP | H09331592 | A | 12/1997 |
| JP | 2002281579 | A | 9/2002 |
| WO | 9806232 | A1 | 2/1998 |
| WO | 2020125940 | A1 | 6/2020 |
| WO | 2020125941 | A1 | 6/2020 |

OTHER PUBLICATIONS

International Search Report of corresponding PCT application, PCT/CN2021/137274, dated Mar. 8, 2022, 5 pages.
Search Report from corresponding European Application No. 21909188.1, mailed Jun. 7, 2024, 5 pages.
Search Report from corresponding Japanese Application No. 2023-561416, mailed Jul. 29, 2024, 8 pages with translation.

* cited by examiner

PERSONAL AUDIO SYSTEM AND APPLICATION THEREOF

CROSS-REFERENCE TO RELATED APPLICATIONS

This application is a national stage filing under 35 U.S.C. § 371 of international application number PCT/CN2021/137274, filed Dec. 12, 2021, which claims priority to Chinese patent application No. 202011569907.1 filed Dec. 26, 2020. The contents of these applications are incorporated herein by reference in their entirety.

TECHNICAL FIELD

The disclosure relates to the field of audio device for replaying music, in particular to a personal audio system which can be used in a headrest or a neck pillow in various environments such as automobiles, airplanes and high-speed rails.

BACKGROUND

Most loudspeakers of modern automobile audios are mounted in door panels or center consoles, but such an installation method has the following defects:

1. Sound field is not centered: Since distances between a seat and door panels on two sides of the seat are different, the sounds from a left loudspeaker and a right loudspeaker will be transmitted to human ears at different times with different intensities, so that the sound field cannot be centered.

2. Sound field is difficult to be distinguished: With the development of the society, more and more people desire to hear their favorite music on vehicles, or nearby people do not want to be disturbed when listening to music, or people do not want others beside them to overhear the conversation of callers when communicating by means of automobile audio device. Current automobile audio device cannot meet such a requirement.

3. The cost is high: At present, mid-to-high-end automobile audio device on the market has a large number of loudspeakers. For example, Cadillac CT6 has been developed to have 34 loudspeakers, and a new generation product has more than 48 loudspeakers.

Although a headset can overcome most of the above defects, the headset needs to be worn on the head of a user, bringing inconvenience to a certain degree. Also, the headset blocks the ears of the user, which brings inconvenience to the user communicating with others beside the user.

Loudspeakers are mounted on some seats, and can play music for personal appreciation. However, such design uses the design thought of a loudspeaker box, and a loudspeaker and a box body which can be mounted on the seat are small in size, resulting in a very poor bass effect, so that the requirement for high-quality music replay is not met.

SUMMARY

The disclosure aims to overcome the defects in the prior art, and provides a personal audio system which can be mounted on a headrest of a seat or a neck pillow against which the shoulders of a user lean.

Due to the fact that sound waves radiated from the front side and the back side of a loudspeaker are the same in amplitude and opposite in phase, under the condition of no blocking, the sound waves radiated from the front side and the back side offset each other, resulting in poor bass which means acoustic short circuiting. In order to prevent the acoustic short circuiting and improve the bass, it is necessary to manage to prevent the sound waves from the front side and the back side of the loudspeaker from being radiated to the same space. A cavity of a loudspeaker box is used for limiting sound waves from the back side of the loudspeaker in an independent space, but the added cavity can cause the lowest resonant frequency of the loudspeaker to increase, resulting in poor bass. According to the disclosure, a novel design thought is used to prevent or weaken the influence of acoustic short circuiting.

The sound wave has a characteristic that each time a propagation distance in a free field space is doubled, the amplitude will be attenuated by half (6 dB). Therefore, if the loudspeaker and a listening position can be kept relatively stable, the sound waves from one side of the loudspeaker can be transmitted to a farther position by means of a conduction tube, and the other side of the loudspeaker is adjacent to the ear. In this way, when the sound waves at a distal end in the free field space are propagated back to the ears, the amplitude is greatly lower than that of the sound waves at a proximal end, thereby obtaining a good bass effect. Particularly, when a propagation distance difference in the free field space is not less than 8 times, the offset amplitude is less than 1 dB, and it can be equivalently considered that no mutual offset occurs. Moreover, by adding a tube to the loudspeaker, the lowest resonant frequency of the loudspeaker can be reduced, and the bass is improved.

However, for people at a distance (the distance is greater than 500 mm), propagation distances of the sound waves from the front side and the back side of the loudspeaker are almost the same, the sound waves are still similar in amplitude and opposite in phase and can offset each other, and thus weakening interference with the people at a distance. In this manner, high-quality private sound replay can be achieved.

Since this equipment does not need to cover the ears of a user, it does not interfere with the communication between a user and other persons or the user can hear external sound needed. In addition, no matter whether it is mounted on a seat or worn on the shoulder, the burden on the user is greatly reduced.

The disclosure is implemented by using the following technical solution.

A personal audio system is provided comprising a housing 10 in which a right front loudspeaker 31, a left front loudspeaker 32 and a controller 50 are all arranged, wherein a right rear conduction tube 41 is arranged on the right front loudspeaker 31, an opening at one end of the right rear conduction tube 41 is tightly connected and sealed to one side of the right front loudspeaker 31, and an opening at the other end of the right rear conduction tube 41 is away from a right ear of a user; a left rear conduction tube 42 is arranged on the left front loudspeaker 32, an opening at one end of the left rear conduction tube 42 is tightly connected and sealed to one side of the left front loudspeaker 32, and an opening at the other end of the left rear conduction tube 42 is away from a left ear of a user.

In the personal audio system as described above, a right front conduction tube 43 is arranged on the right front loudspeaker 31, an opening at one end of the right front conduction tube 43 is tightly connected and sealed to the other side of the right front loudspeaker 31, and an opening at the other end of the right front conduction tube 43 is close to the right ear of the user; a left front conduction tube 44 is arranged on the left front loudspeaker 32, an opening at one end of the left front conduction tube 44 is tightly connected and sealed to one side of the left front loudspeaker 32, and the opening at the other end of the left front conduction tube 44 is close to the left ear of the user.

In the personal audio system as described above, the right front loudspeaker 31 and the left front loudspeaker 32 are the same in structure and are symmetrically arranged, the left front conduction tube 44 and the right front conduction tube 43 are the same in structure and are symmetrically arranged, a distance a between the right front conduction tube 43 and an ear canal opening ranges from 30 mm to 200 mm, and a distance by which a sound wave is radiated by air from a distal end of the right rear conduction tube 41 to the right ear is represented by b, wherein b/a>2.

In the personal audio system as described above, b/a>8, an error between sectional areas of the right front conduction tube 43 and the right rear conduction tube 41 does not exceed 10%, and an error between lengths of the right front conduction tube 43 and the right rear conduction tube 41 does not exceed 10%.

In the personal audio system as described above, the right front loudspeaker 31 and the left front loudspeaker 32 are the same in structure and are symmetrically arranged, the right rear conduction tube 41 and the left rear conduction tube 42 are the same in structure and are symmetrically arranged, and radiation axes of the right front loudspeaker 31 and the left rear conduction tube 42 respectively point to two ears of the user; an included angle θ formed by the two axes ranges from 30° to 170°, a distance a by which a sound wave is radiated from a front side of the right front loudspeaker 31 to the right ear pointed by the right front loudspeaker 31 ranges from 30 mm to 200 mm, a distance by which a sound wave is radiated by air from a distal end of the right rear conduction tube 41 to the right ear is represented by b, wherein b/a>2.

In the personal audio system as described above, b/a>8.

In the personal audio system as described above, the right front loudspeaker 31 and the left front loudspeaker 32 are the same in structure and are symmetrically arranged, a right rear loudspeaker 33 and a left rear loudspeaker 34 are symmetrically arranged in the housing 10, the right rear loudspeaker 33 is reversely arranged behind the right front loudspeaker 31, and the left rear loudspeaker 34 is reversely arranged behind the left front loudspeaker 32.

An application of the personal audio system as described above is provided, the personal audio system is mounted in a headrest of a seat.

An application of the personal audio system as described above is provided, the personal audio system is mounted in a neck pillow.

Compared with the prior art, the disclosure has the following advantages.

1. The personal audio system of the disclosure does not need to be in contact with ears, so that the burden on the user is not increased, and the personal audio system is comfortable to use.

2. The personal audio system of the disclosure is good in tone quality effect and rich in bass. If the loudspeaker is additionally provided with a cavity, the resonant frequency will increase, resulting in poor bass. However, if the loudspeaker is additionally provided with a conduction tube, the resonant frequency will decrease, resulting in a richer bass.

3. The personal audio system of the disclosure is good in lateral symmetry and natural in sound field.

4. The personal audio system of the disclosure can be used with good privacy, and does not disturb others and also enhances the privacy of communication.

In the figures: 10—Housing, 31—Right front loudspeaker, 32—Left front loudspeaker, 50—Controller, 41—Right rear conduction tube, 43—Right front conduction tube, 33—Right rear loudspeaker, 34—Left rear loudspeaker, 44—Left front conduction tube, and 42—Left rear conduction tube.

DETAILED DESCRIPTION

For ease of understanding by a person of ordinary skill in art, the technical features of the disclosure will be further described in detail below in conjunction with the accompanying drawings.

The disclosure provides a personal audio system, in particular to a mechanical structure of the personal audio system. The personal audio system comprises a housing 10, in which a right front loudspeaker 31, a left front loudspeaker 32 and a controller 50 are arranged, the controller 50 is used for controlling the loudspeakers, and the right front loudspeaker 31 and the left front loudspeaker 32 are symmetrically arranged. The personal audio system can be mounted in a headrest of a seat and can also be mounted in a neck pillow to be worn on the shoulders.

At least four embodiments of the disclosure are provided below.

Figure 1:
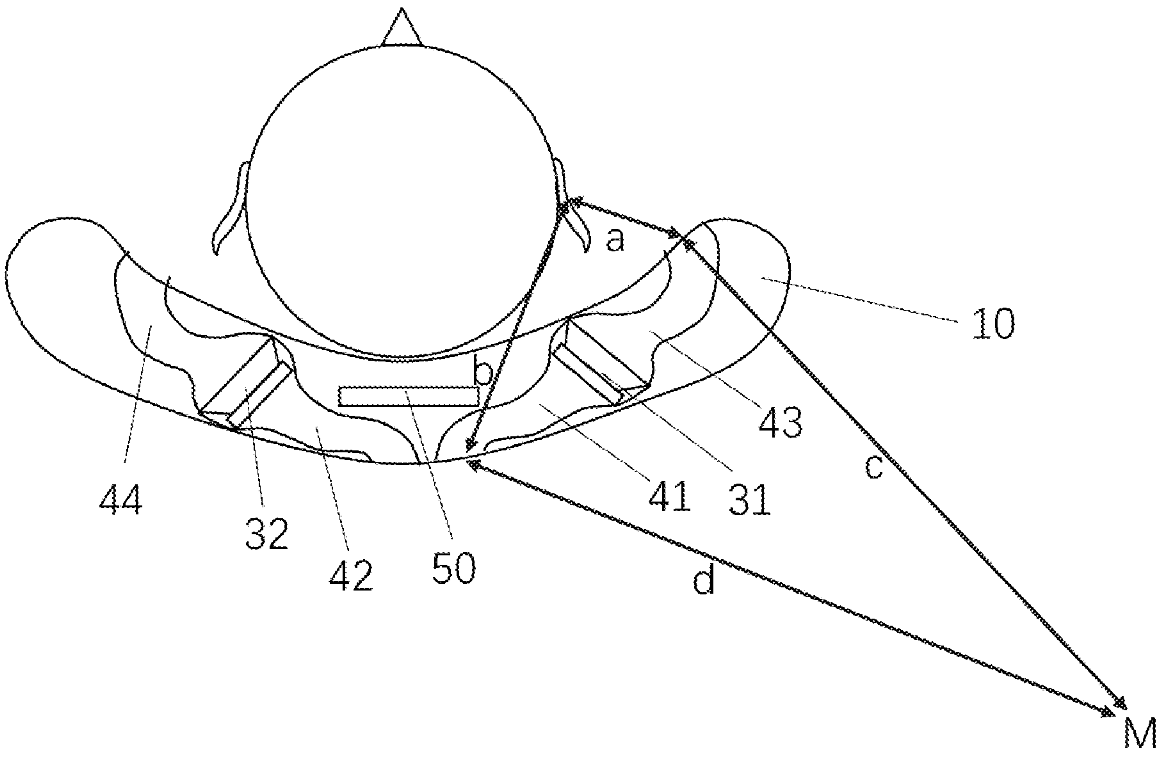
FIG. 1 is a schematic structural diagram of embodiment one of the disclosure.

Embodiment one: As shown in FIG. 1, a personal audio system comprises a housing 10 and a controller 50. A left front loudspeaker 32 and a right front loudspeaker 31 are arranged in the housing 10 and correspond to the left ear and the right ear respectively. To facilitate description, only design of the right channel is introduced below because the left channel and the right channel has the same design. A right front conduction tube 43 is arranged on one side of the right front loudspeaker 31, and the right front conduction tube 43 is tightly connected and sealed to the right front loudspeaker 31. The other end of the right front conduction tube 43 is close to the right ear by a distance a from the ear canal opening, which meets the range condition of 30 mm≤a≤200 mm, and on the premise of not affecting normal use of a user, the smaller the distance a is, the better the tone is. The other side of the right front loudspeaker 31 is tightly connected and sealed to the right rear conduction tube 41, the other end of the right rear conduction tube 41 is far away from the right ear, and the shortest propagation distance b of sound waves from the right ear meets the condition of b/a>2. If b/a>8, the sound effect heard by the right ear is almost the optimal.

A distance from a distal point M to the user is usually greater than 500 mm, so that a difference c between distances from the tail ends of the right front conduction tube 43 and the right rear conduction tube 41 to the point M meets c/d<1. Since the sound waves emitted from the front side and the back side of the right front loudspeaker 31 are the same in amplitude and opposite in phase, when the sound waves are propagated to the point M, the sound waves offset each other, thereby weakening the sound heard by the user at the point M. In order to achieve the best sound reduction effect, one of preferable manners is that the right front conduction tube 43 and the right rear conduction tube 41 have similar sectional areas and lengths, with an error not exceeding 10%.

If the right front conduction tube 43 and the right rear conduction tube 41 cannot be designed to be similar in size, accurate sound reduction can be achieved by measuring sound wave characteristics at conduction tube openings. After the design of the right front conduction tube 43 is finalized, the sound wave at the opening of the right rear conduction tube 41 is measured. If the sound wave amplitude of the opening of the right rear conduction tube 41 is greater than that of the opening of the right front conduction tube 43, the sectional area of the right rear conduction tube 41 may be decreased, or the length of the right rear conduction tube 41 may be increased. On the contrary, the sectional area of the right rear conduction tube 41 is increased or the length of the right rear conduction tube 41 is decreased, and this adjustment is performed until a difference between sound wave frequency response curves at the two conduction tube openings is not greater than 6 dB after the two curves are subjected to ⅓ octave smoothing.

Figure 2:
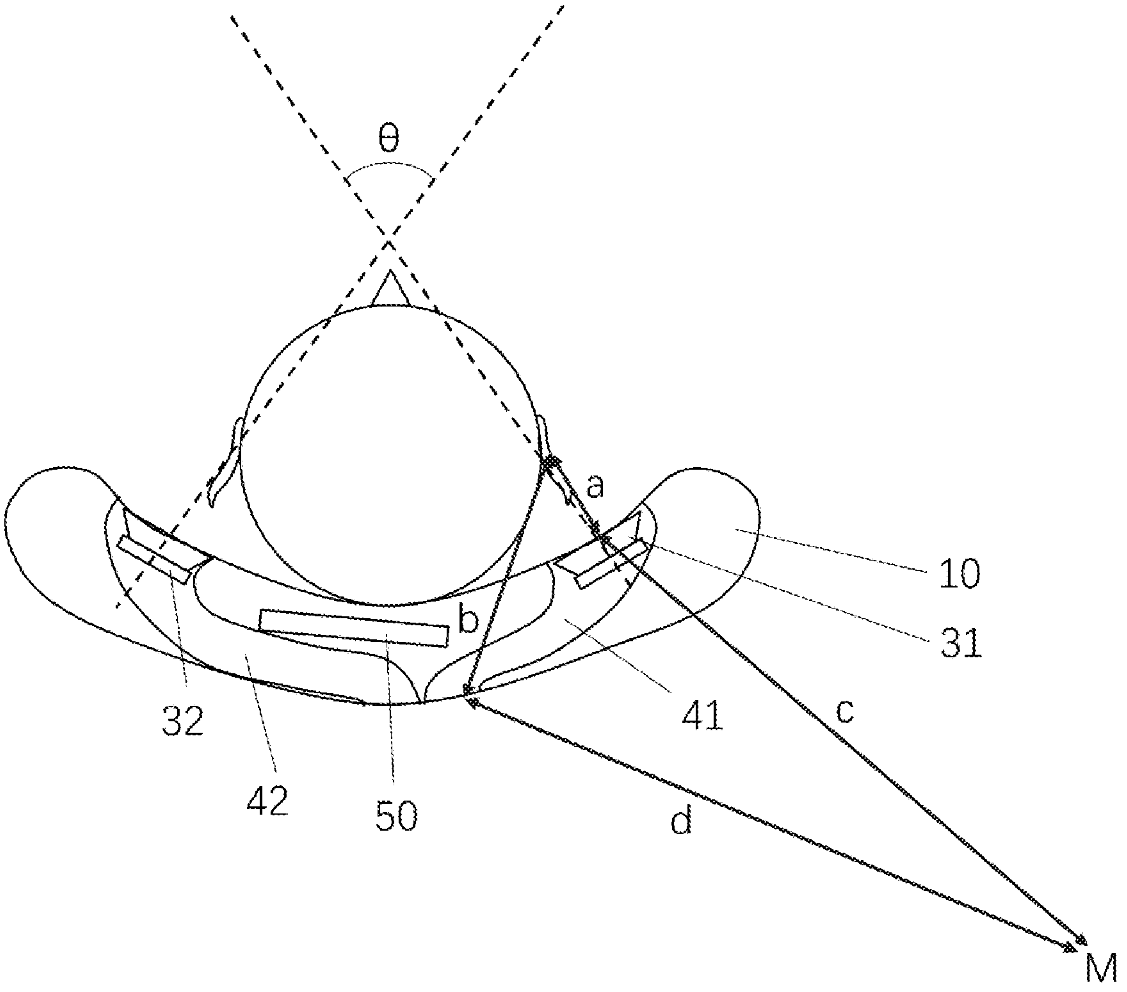
FIG. 2 is a schematic structural diagram of embodiment two of the disclosure.

Embodiment two: The right front conduction tube 43 and the right rear conduction tube 41 of the embodiment described above may both be sized according to requirements. When no front conduction tube is arranged due to shortening, the embodiment is illustrated as shown in FIG. 2. An active sound reduction apparatus comprises a housing 10, a controller 50, a right front loudspeaker 31 and a left front loudspeaker 32. To reduce the influence on the user, the right front loudspeaker 31 and the left front loudspeaker 32 are both located behind or below the right and left ears, and the distance a from the ear canal opening of the user meets the condition of 30 mm≤a≤200 mm. When the distance is less than 30 mm, the apparatus is likely to be in contact with the human ears, causing discomfort. When the distance is greater than 200 mm, the stability of a sound field is poor, and the effect is also poor.

The radiation axes of the two loudspeakers point to the right and left ears, so that an included angle θ is formed and meets the condition of 30°<θ<170°. Since the right front loudspeaker 31 and the left front loudspeaker 32 and their related accessories are symmetrical bilaterally, only the design of the right channel will be described next. The right front loudspeaker 31 is connected and sealed to one end of the right rear conduction tube 41, and an opening at the other end of the right rear conduction tube 41 is away from the right ear. The shortest propagation distance between the distal opening of the right rear conduction tube 41 and the sound wave to the right ear is represented by b, and if b/a>2, a good bass effect can be obtained; and if b/a>8, the optimal effect can be obtained.

For the user at the distal point M, a distance c between the right front loudspeaker 31 and the point M is almost the same as a distance d between the opening of the right rear conduction tube 41 and the point M, so that the sound waves radiated from the front side and the back side of the right front loudspeaker 31 still meet the offset condition at the point M. In order to achieve the optimal sound reduction effect, it is required to make adjustment according to the sound wave characteristics at the openings of the right front loudspeaker 31 and the right rear conduction tube 41. Generally, the sound wave radiated by the right front loudspeaker 31 is greater, and it is required to adjust the radiation area of the opening of the right front loudspeaker 31. By decreasing the area of the opening and increasing radiation damping, the sensitivity of the sound wave directly radiated by the right front loudspeaker 31 can be reduced, and the optimal offset effect that the difference between the sound wave frequency response curves is not greater than 6 dB after the two curves are subjected to ⅓ octave smoothing can be obtained.

Figure 3:
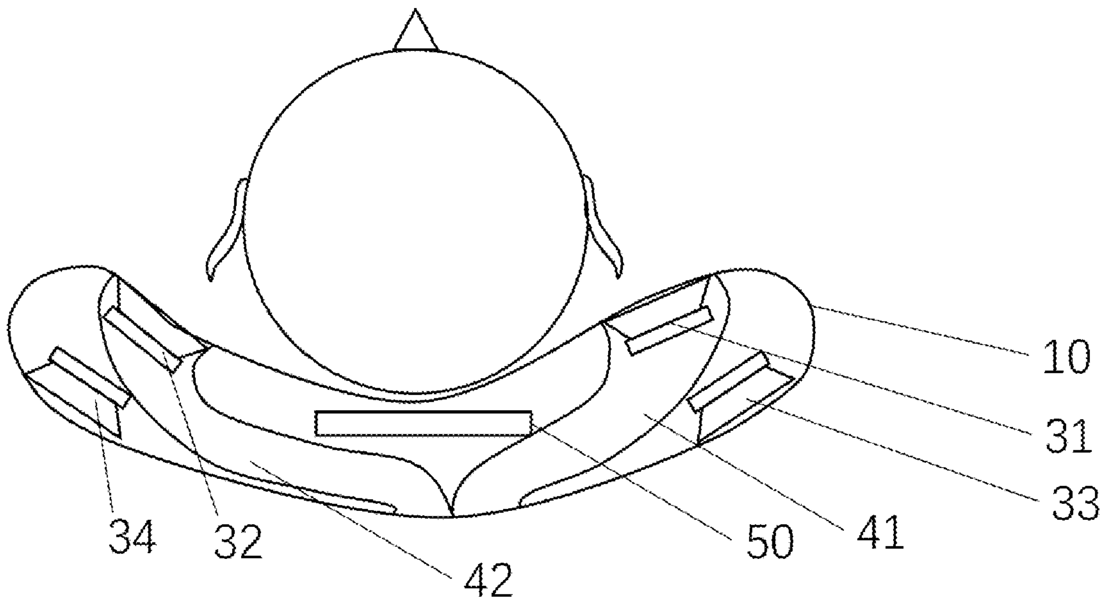
FIG. 3 is a schematic structural diagram of embodiment three of the disclosure.

Embodiment three: As shown in FIG. 3, a right rear loudspeaker 33 and a left rear loudspeaker 34 are added on the basis of the embodiment of FIG. 2. The sound waves radiated outwards by the rear loudspeaker and the front loudspeaker are the same in amplitude and opposite in phase.

Since the right rear conduction tube 41 and the left rear conduction tube 42 are additionally arranged on the back of the right front loudspeaker 31 and the back of the left front loudspeaker 32 respectively, the sound waves at the openings of the rear conduction tubes (41 and 42) are less than the sound waves radiated by the front loudspeakers (31 and 32), and therefore the rear loudspeakers (33 and 34) are additionally arranged. A difference value is calculated by measuring the sound waves radiated directly by the front loudspeakers (31 and 32) and the sound waves radiated from the openings of the rear conduction tubes (41 and 42). The response characteristics of the rear loudspeakers (33 and 34) are then controlled by the controller 50, so that the sound waves replayed by the rear loudspeakers (33 and 34) are just equal to the difference value, thereby achieving a better sound reduction effect.

Figure 4:
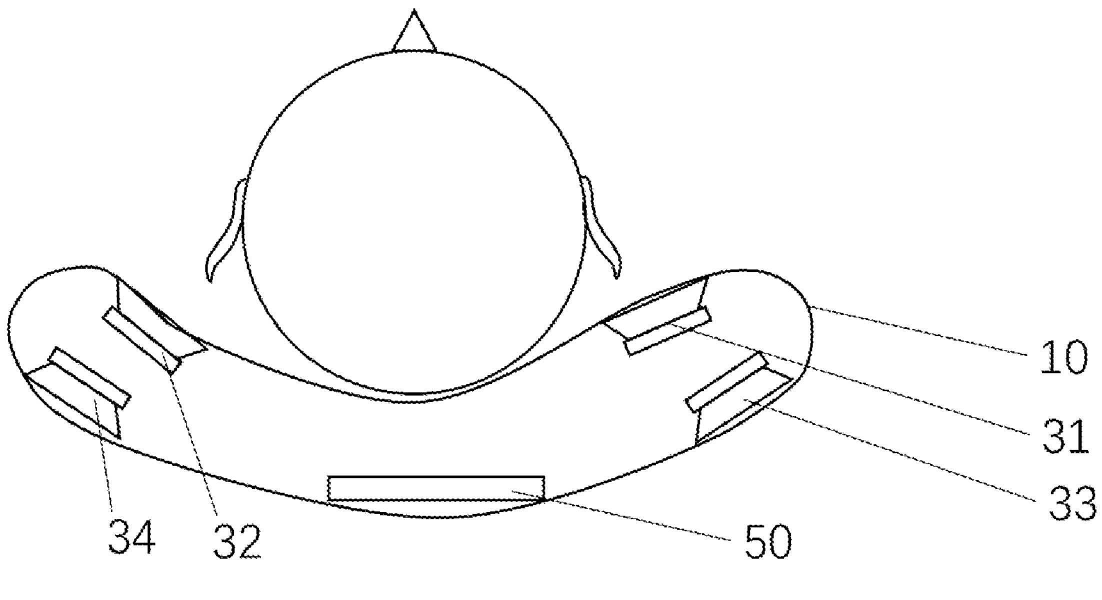
FIG. 4 is a schematic structural diagram of embodiment four of the disclosure.

Embodiment four: In the embodiment of FIG. 4, the rear conduction tubes (41 and 42) are removed on the basis of the embodiment of FIG. 3, saving the cost. The sound waves radiated by the front loudspeakers (31 and 32) toward a surrounding space are offset only by the rear loudspeakers (33 and 34). This design can enable most of the functions of FIG. 3, but the bass effect is slightly poor.

The above embodiments are only preferred embodiments of the disclosure and are not intended to limit the concept and scope of the disclosure, and without departing from the gist and scope of the disclosure, various modifications and improvements made on the technical scheme of the disclosure by a person of ordinary skill in the art shall fall within the claimed protection scope of the disclosure.

What is claimed is:

1. A personal audio system, comprising: a housing in which a right front loudspeaker, a left front loudspeaker and a controller are all arranged; wherein a right rear conduction tube is arranged on the right front loudspeaker, an opening at one end of the right rear conduction tube is tightly connected and sealed to one side of the right front loudspeaker, and an opening at the other end of the right rear conduction tube is away from a right ear of a user; a left rear conduction tube is arranged on the left front loudspeaker, an opening at one end of the left rear conduction tube is tightly connected and sealed to one side of the left front loudspeaker, and an opening at the other end of the left rear conduction tube is away from a left ear of the user;

wherein a right front conduction tube is arranged on the right front loudspeaker, an opening at one end of the right front conduction tube is tightly connected and sealed to the other side of the right front loudspeaker, and an opening at the other end of the right front conduction tube is close to the right ear of the user; a left front conduction tube is arranged on the left front loudspeaker, an opening at one end of the left front conduction tube is tightly connected and sealed to one side of the left front loudspeaker, and an opening at the other end of the left front conduction tube is close to the left ear of the user.

2. The personal audio system according to claim 1, wherein the right front loudspeaker and the left front loudspeaker are the same in structure and are symmetrically arranged, the left front conduction tube and the right front conduction tube are the same in structure and are symmetrically arranged, a distance a between the right front conduction tube and an ear canal opening ranges from 30 mm to 200 mm, a distance by which a sound wave is radiated by air from a distal end of the right rear guide tube to the right ear is represented by b, and b/a>2.

3. The personal audio system according to claim 2, wherein b/a>8; an error between sectional areas of the right front conduction tube and the right rear conduction tube does not exceed 10%, and an error between lengths of the right front conduction tube and the right rear conduction tube does not exceed 10%.

4. The personal audio system according to claim 1, wherein the right front loudspeaker and the left front loudspeaker are the same in structure and are symmetrically arranged, the right rear conduction tube and the left rear conduction tube are the same in structure and are symmetrically arranged, and radiation axes of the right front loudspeaker and the left front loudspeaker respectively point to two ears of the user; an included angle θ formed by the two axes ranges from 30° to 170°, a distance a by which a sound wave is radiated from a front side of the right front loudspeaker to the right ear pointed by the right front loudspeaker ranges from 30 mm to 200 mm, a distance by which a sound wave is radiated by air from a distal end of the right rear conduction tube to the right ear is represented by b, and b/a>2.

5. The personal audio system according to claim 4, wherein b/a>8.

6. The personal audio system according to claim 1, wherein the right front loudspeaker and the left front loudspeaker are the same in structure and are symmetrically arranged, a right rear loudspeaker and a left rear loudspeaker are symmetrically arranged in the housing, the right rear loudspeaker is reversely arranged behind the right front loudspeaker, and the left rear loudspeaker is reversely arranged behind the left front loudspeaker.

* * * * *